United States Patent Office 2,960,415
Patented Nov. 15, 1960

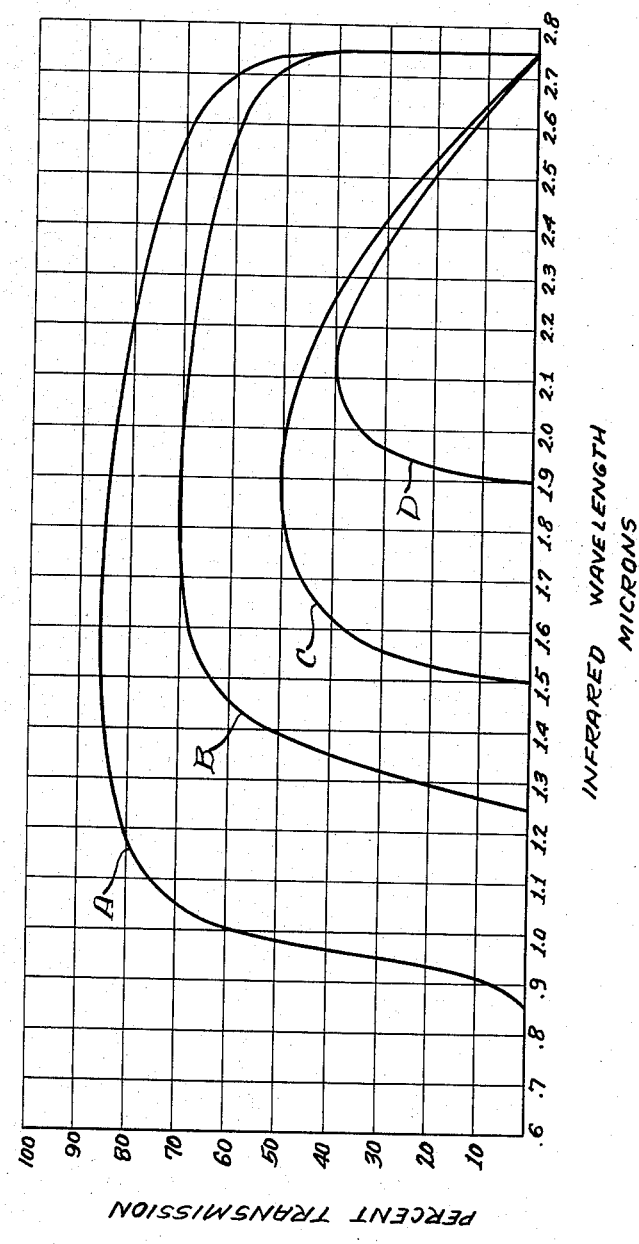

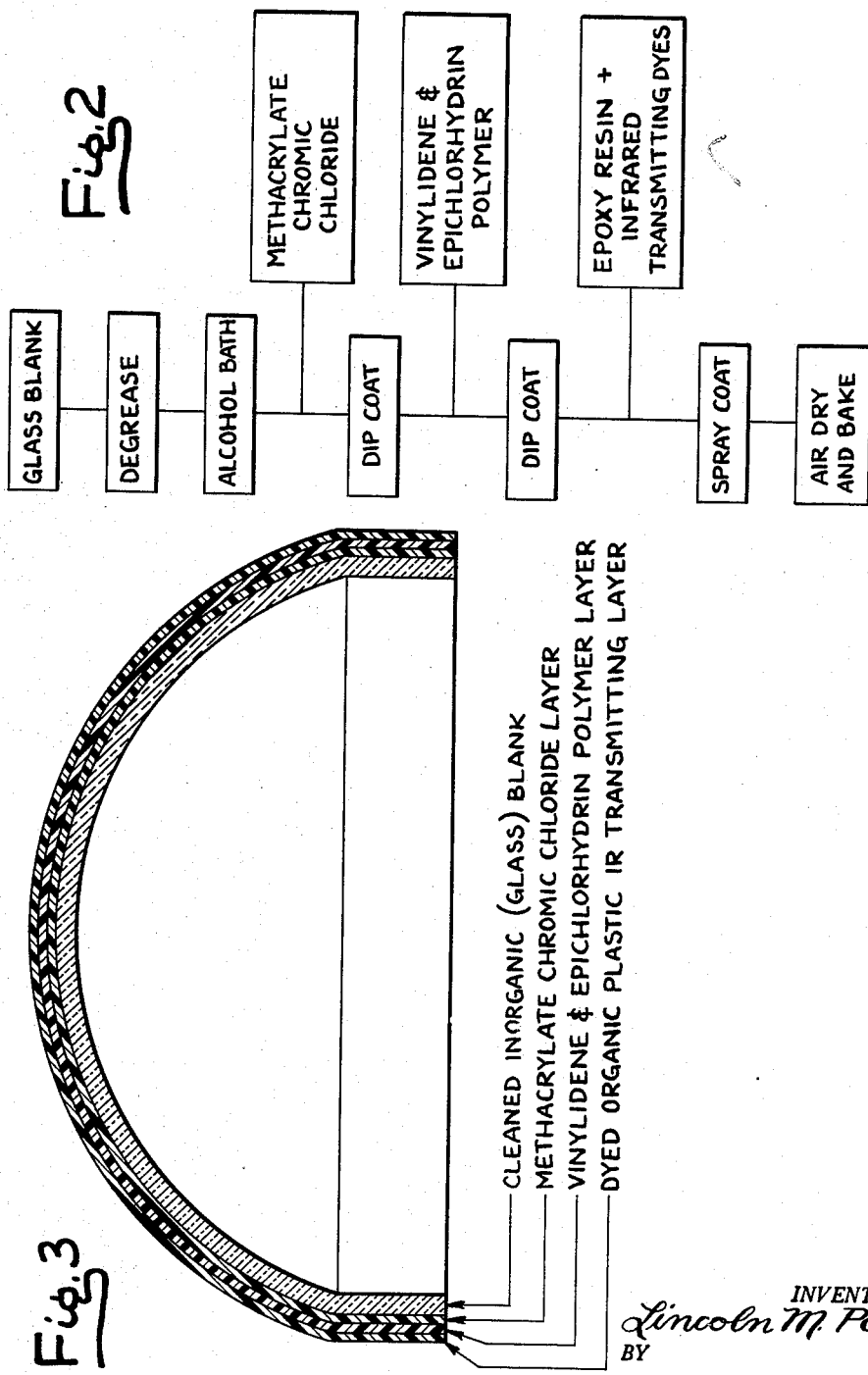

2,960,415

INFRARED FILTER AND METHOD OF PRODUCING THE SAME

Lincoln M. Polan, Huntington, W. Va., assignor to Polan Industries Incorporated, Huntington, W. Va., a corporation of West Virginia Filed June 23, 1958, Ser. No. 743,653

11 Claims. (Cl. 117—33.3)

The present invention relates to infrared filters, and more particularly to an improved filter capable of withstanding severe heat and humidity conditions yet having a high percentage transmission of infrared light.

It is the primary object of the present invention to provide a new and improved infrared filter of the type having an infrared dye containing organic layer superimposed on a glass or other inorganic substrate. More particularly, it is an object to provide an organic infrared filter which is resistant to heat and humidity conditions which does not cause scattering of the desired infrared wave lengths. Another object of the present invention is to provide an infrared filter of the foregoing type which has good transmission characteristics and low transmission loss of the desired wave lengths.

A more specific object of the present invention is to provide an improved infrared transmitting organic coating on a glass substrate by the application of strongly adhering superimposed coatings, which coatings exhibit greater adhesive qualities to each other and to the adjacent material than does the dye containing resin to the inorganic substrate.

A further object of the present invention is to provide an infrared filter which is dimensionally stable over a wide temperature range and which does not exhibit either swelling or shrinking when subjected to high humidity conditions.

Other objects and advantages of the present invention will become apparent as the following description proceeds taken in connection with the accompanying drawing wherein:

Figure 1 illustrates the transmission characteristics of a filter prepared in accordance with the present invention.

Fig. 2 is a schematic flow diagram illustrating an illustrative process of preparing a filter in accordance with the invention.

Fig. 3 is a section view through a filter embodying the invention and having legends indicating materials employed.

In the art of producing infrared filters wherein an organic infrared dye transmitting layer is superimposed on an inorganic substrate such as glass, filters produced according to known methods have failed primarily for two reasons. First, the filters were unable to withstand a sufficiently wide temperature range, that is from —40 to about +160° F. and high humidity conditions up to 95% relative humidity. The plastic coatings failed because of shrinkage of plastic material under conditions of heat and humidity which set up such strong tensile forces that the coatings pulled away from the glass and at times damaged the glass surface. Other difficulties were encountered by poor adhesion between the plastic and the glass. The action of humidity is not only that of having the water vapor move into whatever space may exist between two strata and thereby effect separation, but also as a result of the tendency of the water vapor to create swelling or contraction or to increase the surface tension characteristics of the materials making up one or both of the strata and thereby cause the materials to move dimensionally relative to each other. In the case of the glass base, contraction or expansion is the strongest separating force for two reasons. First, the glass has a low modulus of elasticity and secondly, when forces create conditions of relatively high surface tension on the surface of the glass body, the surface layer tends to shear or rupture. These forces result in complete or partial deterioration of the glass body. If, for example, the force of adhesion between a glass or other body and a coating is greater than the modulus of elasticity of the body, the coating, upon shrinking, will set up sufficient surface tension to fracture the body or pull sections of the glass away from the surface. Breakage will also result where the adhesive forces of the coating are greater than the modulus of elasticity when the coating is of the kind which swells under humidity. Thus, the total sum of the forces set up by the coating must exert less than the force necessary to rupture the body or surface of the substrate which is coated.

In accordance with one aspect of my invention, I have found that the effect of forces tending to separate the infrared dye containing organic coating from the glass substrate may be modified by applying a plurality of intermediate layers between the glass and the final resin coating. However, not all coatings known to be effective as adhesives are satisfactory for the reason that they adversely affect the transmission of infrared wave lengths through the filter.

Certain standards have been set up for example by branches of the armed services such as the Signal Corps, for optical components including infrared filters. These standards require, in addition to certain optical values, that the filter withstand certain environmental tests, for example as set forth in Department of Defense specifications MIL–STD–150, dated October 23, 1950. Briefly, the standards in MIL–STD–150 require that an optical component withstand a temperature and humidity test cycle over a temperature range of from about 68° F. to about 149° F. with a rate of temperature change between about 86° F. and 149° F. of not less than 15° F. per hour, at 90 to 95% relative humidity, over a period of 48 hours, without failure or appearance of defects.

An accepted standard for infrared filters, with an unfiltered source at about 2850° K. C.T., is an effective heat transmission (EHT) value of between about 9% and about 19% and a corresponding visual transmission coefficient, i.e. an effective visual transmission (EVT) of between about $1 \times 10^{-9}$ and about $1.7 \times 10^{-8}$ respectively. The brightness of an infrared source is given by the brightness of the unfiltered source (about 2850° K. C.T.) multiplied by the visual transmission (EVT) of the filter.

In accordance with the present invention, I have found that a humidity and temperature resistant infrared filter can be produced by coating a glass substrate with a molecular layer of methacrylate chromic chloride, upon which is applied a second sub layer of a latex of polyvinylidene and epichlorhydrin, and finally applying a coating of an epoxy resin containing appropriate infrared transmitting dyes, the final coating being thick enough to give the desired transmission characteristics. Filters, coated in accordance with this invention, have been found to be stable over a wide temperature range and under conditions of high humidity as described above in addition to having the desired transmission characteristics.

It has been found that the use of the substrata or sub layers effectively prevent separation of the main epoxy resin coating from the main glass substrate. Thus, each of the sub layers has a greater adhesion for the adjacent materials than does the final epoxy resin coating for the main glass substrate. The coating can be readily applied to glass discs, domes, curved plates, etc. and the application is extremely simple and easy to carry out.

As a base layer or substrate on the glass body of the filter, I use a substance capable of strongly adhering to negatively charged surfaces such as siliceous materials. Illustrative of such materials are the Werner type chromium complexes one of which is methacrylate chromic chloride, a complex of chromium and methacrylic acid available as a chloride. Films formed of this compound are capable of combining with a wide variety of unsaturated resin-forming materials such as those containing vinyl, allyl, and methacryl groups. One commercial source of methacrylate chromic chloride is the product sold under the trade name "Volan" by E. I. du Pont de Nemours & Co., Inc. Methacrylate chromic chloride has been found to be particularly useful as a substrate in the present invention, and has negligible effect on the transmission of infrared waves.

The infrared transmitting dye containing epoxy resin layer when applied directly onto the methacrylate chromic chloride layer, is not resistant to separation at high humidities and over the prescribed temperature range. The filter so formed is unsatisfactory, and the coating fails to adhere after only a short period of time, about 24 hours, when the filters are subjected to 95% R.H. over a temperature range of from about 68° to about 150° F. I have found that an improved, environmental stable filter can be produced by first coating the methacrylate chromic chloride substrate with an adherent latex material formed of a mixture of a polyvinylidene compound such as polyvinylidene chloride, a primary amine, and epichlorhydrin, one such composition being sold under the trade name "Permalastic" by Permalastic Products. This latex material is soluble in the subsequently applied epoxy resin coating and redissolves therein to form a highly complex molecular material as an intermediate strata.

Epoxy resins for the infrared dye containing coating are formed by mixing the condensation product of bisphenol and epichlorhydrin with a triamine. For example, one epoxy resin useful in accordance herewith is formed by mixing, as a base, (diglycidyl ether) bisphenol-A, the condensation product of epichlorhydrin and bisphenol-A, with an admix of diethylenetriamine, to form a long chain cross linked resin. Epoxy resins of this type are sold commercially under the trade name "Epon" by the Shell Chemical Corporation and the trade name "Permagile" by Permagile Corporation of America.

In order to form a dye containing epoxy resin coating on the previously coated filter substrates, the desired dyes are mixed with the epoxy base, the admix is added, and the mixture is applied as a coating to the previously undercoated substrate. In some instances, the chromic methyl methacrylate radicals may form with the polyvinylidene and epoxies to form a single long chain compound, to provide numerous strong bonds throughout the coatings.

The materials employed do not interfere with the transmission of near and intermediate infrared (0.75 to 3.0 microns). The materials described above have absorption bands at 3.0, 6.25, 11.35 and 12.1, and thus do not interfere.

The following is an example to illustrate the present invention. A glass filter disc is cleaned and degreased by exposing to trichlorethylene vapors and then rinsing in trichlorethylene. The surfaces of the degreased disc are then washed with alcohol and dried.

A solution of methacrylate chromic chloride is prepared by diluting "Volan" methacrylate chromic chloride with water to a concentration between ½ and 2%. For example, 100 parts of "Volan" are diluted with 4,680 parts of water to give a concentration of about 1.7%. This solution, being acidic, is partly neutralized with a suitable base such as ammonia. To this end, 222 parts of aqueous ammonia (1% $NH_3$) is added to adjust the pH to a value between 5 and 6.5. The cleaned filter discs are then immersed in the methacrylate chromic chloride solution and dried in an even heat at 90 to 100° F. The process is repeated approximately 3 times and after the final dip the discs are dried and washed with warm water. The plurality of dips is for the purpose of insuring complete coverage and not for increasing the thickness of the coating.

One surface of the disc is then coated with a polyvinylidene chloride-epichlorhydron latex, such as a "Permalastic" latex coating solution, having a total solids content of about 42.6% and which comprises between about 10 to about 20%, and preferably about 15% polyvinylidene chloride, between about 60 and about 80%, and preferably about 70% epichlorhydrin latex, with an amount between about 10 and about 20%, and preferably about 15%, of primary polymeric amine of high molecular weight to polymerize the epichlorhydrin, in an amount of thinner such as toluene and diisobutyl ketone sufficient to give a solids content, between about 40 and about 45%, and more specifically about 42.6%. To apply the coating, the disc is placed on a suction cup on the end of a stick and dipped into the latex solution. The coated disc is then allowed to dry for about ½ hour at room temperature.

Transmission measurements on uncoated glass discs show a percent infrared transmission between 86 and 89%. Glass discs coated with the above described methacrylate chromic chloride and vinylidene-epichlorhydrin latex show a percent transmission between 86 and 91%, depending upon the wave length of the infrared light. Thus, the percent transmission of the coated glass disc is either the same as the uncoated glass disc, or the percent transmission is improved.

The discs are then treated with an epoxy resin layer containing infrared transmitting dyes. It has been found that a combination of Luxol Navy Blue NA and Luxol Fast Green B dyes, both products of E. I. du Pont de Nemours & Co., in the ratio of 4 to 1 Luxol Navy Blue NA to Luxol Fast Green B, provide adequate cut-off of the shorter wave lengths of infrared light and do not transmit the visible spectrum. Two epoxy resins found useful in accordance with the invention are formed as the condensation product of epichlorhydrin and bisphenol A of which commercially illustrative resins are "Epon 828" and "Permagile." These resins are generally liquids, the former being sold by Shell Chemical Corporation and the latter by Permagile Corporation of America. To prepare one illustrative epoxy resin coating containing appropriate selected dyes, 34 parts by volume of the "Permagile" resin and 10.6 parts by volume of methyl Cellosolve are mixed with 4 grams Luxol Navy Blue NA and 1 gram Luxol Fast Green B for each 34.4 parts of the base resin. The mixer is run for 8 hours to insure complete blending of the dyes with the base. At the end of that time the "Permagile admix" (diethylene triamine) is added in equal parts by volume to the base resin along with 21.2 parts by volume of methyl Cellosolve, and the mixture is stirred at slow speed for 30 minutes. The resin and dye mixture is then sprayed onto the coated surface of the disc until a film having a thickness of approximately 1 mil has been applied. The disc is then covered with a dust cover in a positive air duct and is air dried for 30 minutes. The air dried disc is baked 20 minutes at 200° F. and additional coats of the resin are applied until the required visual security is obtained. A lens having an EVT value of $1.7 \times 10^{-8}$ or better can be readily maintained with a coating of about 5 mils.

Finally, two thin coats (about 1 to 2 mils) of clear epoxy resin with no dyes added are applied. After application of the last coat the disc is baked for 1½ hours at 200° F. If desired, the edges of the disc may be coated with the coatings described above by using a small camel's hair brush.

The optical characteristics of the filter thus produced are shown in the drawing. This filter has an EVT value of $7.6 \times 10^{-9}$, and an EHT of 16.8%. The lenses thus coated also exhibit a satisfactory cut-off of the visible wave lengths (wave lengths of visible light are about $7 \times 10^{-1}$ to about $4 \times 10^{-1}$ microns, while infrared wave lengths are from about $1 \times 10^3$ to $7 \times 10^{-1}$ microns).

The percent transmission of the wave lengths in the near infrared (up to about 1.1 microns) and the intermediate infrared (above about 1.1 to about 2.8) range is high, and in the vicinity of about 85%. The figure illustrating characteristics of a near infrared filter produced in accordance with the invention shows a cut-off below a wave length of 0.85 micron, and a transmission as high as 80 to 86% between wave lengths of about 1.15 to about 2.50 microns (curve A). In general, EVT values desirably extend from a high of about $5 \times 10^{-8}$ to about $1 \times 10^{-9}$ with corresponding EHT values of from about 17.5% to a minimum of about 9.0%. The drawing shows a sharp reduction of transmission at a wave length of 2.75 microns. This is due to the characteristics of the plastic coating used, and the filters or coated glass are considered to be opaque beyond this point.

While one filter having a given cut-off has been described in detail for purposes of illustration, it will be understood by those skilled in the art that filters having different cut-off values can be produced according to the invention. For example, curves B, C and D shown in the drawing are illustrative of filters having cut-off values at 1.25, 1.5 and 1.9 microns respectively.

Because the intermediate polyvinylidene latex adheres strongly to the methacrylate chromic chloride coating and, by redissolving and combining with the epoxy resin coating, forms a polymeric bond with the epoxy resin, the filters have been found to be exceptionally resistant to destruction under high humidity and severe temperature conditions. This intermediate latex layer is also highly elastic, as a result of the use of the polymeric amine to form a high molecular weight substance, again leading to the formation of an exceptionally strong bond between the dye containing layer and the glass.

I claim as my invention:

1. An infrared filter comprising a glass filter substrate member, a first layer of methacrylate chromic chloride on the outer surface of said substrate, a second layer on the outer surface of said first layer comprising a mixture of polyvinylidene chloride and epichlorhydrin polymers, and a third layer on the outer surface of said second layer comprising an epoxy resin polymer containing infrared transmitting dyes in an amount sufficient substantially to prevent transmission of visible light.

2. An infrared filter of the type claimed in claim 1 wherein the filter produced has an effective visual transmission coefficient (EVT) of between about $5 \times 10^{-8}$ and about $1 \times 10^{-9}$, and a corresponding effective heat transmission value (EHT) of between about 19% and about 9%.

3. An infrared filter of the type claimed in claim 1 having a wavelength cut-off value between about 0.75 and about 1.9 microns.

4. An infrared filter of the type described in claim 1 wherein said infrared transmitting dyes comprise Luxol Navy Blue NA and Luxol Fast Green B in a weight ratio of 4 parts Blue to 1 part Green.

5. An infrared filter of the type claimed in claim 4 wherein the filter has an effective visual transmission coefficient (EVT) of $7.6 \times 10^{-9}$ and an effective heat transmission value (EHT) of 16.8%.

6. The method of producing an infrared filter having a glass base coated with infrared transmitting layers which comprises applying to the surface of the glass a coating of methacrylate chromic chloride, applying to one methacrylate chromic chloride treated glass surface a coating of a mixture of polyvinylidene chloride and epichlorhydrin polymers, applying to the surface thus treated a coating of a heat curable epoxy resin containing Luxol Navy Blue NA and Luxol Fast Green B infrared transmitting dyes in the weight ratio of 4 parts Blue to 1 part Green, and curing the epoxy resin by heating the treated glass.

7. The method of producing an infrared filter having a glass base coated with infrared transmitting layers, which comprises applying to the surface of the glass a coating of methacrylate chromic chloride, applying to one methacrylate chromic chloride treated glass surface a coating of a mixture of polyvinylidene chloride and epichlorhydrin polymers, applying to the surface thus treated a coating in an amount sufficient to obtain the required visual security of a heat curable epoxy resin containing Luxol Navy Blue NA and Luxol Fast Green B infrared absorbing dyes in the weight ratio of 4 parts Blue to 1 part Green, curing the epoxy resin coating by heating, applying to said dye containing coating at least one coating of curable clear epoxy resin, and curing said clear epoxy resin by heating the treated glass.

8. The method of producing an infrared filter having a glass base coated with infrared transmitting layers which comprises applying to the surface of the glass a coating of methacrylate chromic chloride, applying to one methacrylate chromic chloride treated glass surface a coating of a mixture of polyvinylidene chloride and epichlorhydrin polymers, applying to the surface thus treated a coating of a heat curable epoxy resin containing infrared transmitting visual light absorbing dyes, and curing the epoxy resin by heating the treated glass.

9. The method of producing an infrared filter having a glass base coated with infrared transmitting layers which comprises applying to the surface of the glass a coating of methacrylate chromic chloride, applying to one methacrylate chromic chloride treated glass surface a coating of a mixture of polyvinylidene chloride and epichlorhydrin polymers, applying to the surface thus treated a coating of a heat curable epoxy resin containing infrared transmitting visual light absorbing dyes, curing the epoxy resin by heating the treated glass, applying to said dye containing coating at least one coating of a heat curable clear epoxy resin, and curing said clear epoxy resin by heating the treated glass.

10. The method of producing an infrared filter having a glass substrate coated with infrared transmitting layers which comprises applying to the surface of the glass a coating of methacrylate chromic chloride, applying to one methacrylate chromic chloride treated glass surface a coating of a mixture of polyvinylidene chloride and epichlorhydrin polymers, applying to the surface thus treated a coating of an epoxy resin containing infrared transmitting visual light absorbing dyes, and applying to said dye containing coating at least one coating of a clear epoxy resin.

11. An infrared filter comprising a glass filter substrate member, a first layer of methacrylate chromic chloride on the outer surface of said substrate, a second layer on the outer surface of said first layer comprising a mixture of polyvinylidene chloride and epichlorhydrin polymers, a third layer on the outer surface of said second layer comprising an epoxy resin polymer containing infrared transmitting dies in an amount sufficient substantially to prevent transmission of visible light and an outer layer on the surface of said polymer comprising a clear epoxy resin polymer.

References Cited in the file of this patent

UNITED STATES PATENTS

| | | |
|---|---|---|
| 2,544,666 | Goehel et al. | Mar. 13, 1951 |
| 2,579,543 | Brode et al. | Dec. 25, 1951 |